March 10, 1942.    E. M. BERNDT    2,275,498
DRIVING CONNECTION FOR FILM-HANDLING APPARATUS
EMPLOYING REMOVABLE FILM MAGAZINES
Original Filed Sept. 21, 1938    3 Sheets-Sheet 1

INVENTOR
ERIC M. BERNDT
BY Otto J. Nathansohn
AGENT

March 10, 1942.  E. M. BERNDT  2,275,498
DRIVING CONNECTION FOR FILM-HANDLING APPARATUS
EMPLOYING REMOVABLE FILM MAGAZINES
Original Filed Sept. 21, 1938    3 Sheets-Sheet 2

INVENTOR
ERIC M. BERNDT
BY Otto J. Nathansohn
AGENT

March 10, 1942.     E. M. BERNDT     2,275,498
DRIVING CONNECTION FOR FILM-HANDLING APPARATUS
EMPLOYING REMOVABLE FILM MAGAZINES
Original Filed Sept. 21, 1938     3 Sheets-Sheet 3

INVENTOR
ERIC M. BERNDT
BY Otto J. Nathansohn
AGENT

Patented Mar. 10, 1942

2,275,498

UNITED STATES PATENT OFFICE 2,275,498

DRIVING CONNECTION FOR FILM-HANDLING APPARATUS EMPLOYING REMOVABLE FILM MAGAZINES

Eric M. Berndt, New York, N. Y., assignor, by mesne assignments, to J. A. Maurer, Inc., a corporation of New York Original application September 21, 1938, Serial No. 231,030. Divided and this application February 28, 1939, Serial No. 258,905

36 Claims. (Cl. 242—55)

The present invention relates to driving connections for film-handling apparatus employing removable film magazines, for example, motion picture cameras and sound recorders. It is a division of my application Serial No. 231,030, filed September 21, 1938, and assigned to the same assignee as the present application.

Such film-handling apparatus have associated therewith a suitable reversible actuating mechanism from which drive is transmitted to either of two spindles. These two spindles, which carry film rolls, are rotatably supported either by two single-roll film magazines or by a single two-roll film magazine, the magazines being in either case removably attached to the film-handling apparatus. The film, after having been loaded on one spindle, is unwound from this feed or supply spindle, passes through the film-handling apparatus wherein it is handled, for example, exposed to the action of light, and then is wound or taken up on the other spindle, the take-up spindle.

A common way of establishing a driving connection in such apparatus is to drive the take-up spindle by means of a belt passing over a pulley mounted on the take-up spindle and usually placed on the outside of the magazine; the belt being driven by the actuating mechanism associated with the film-handling apparatus. One disadvantage of this arrangement is the fact that when a magazine is to be attached to the apparatus, it is necessary for the operator to take the belt, hanging loose from the apparatus, and place it over the pulley. In the course of rapid work, the operator may easily forget to attach the belt when changing magazines. The result is that, after operation has been started, the film is not taken up, but accumulates in the apparatus, where it jams, stopping the apparatus and sometimes even breaking delicate parts of its mechanism.

For making double exposures, or for trick work of other sorts, or for other purposes, it is often desirable to wind the film back in the apparatus, and for that purpose it is customary to provide a pulley also on the feed spindle. Hence, in order to wind the film back, the operator must not only reverse the actuating mechanism, but must also shift the belt from the normal take-up pulley to the normal feed pulley, and when he is ready to resume ordinary operation, the belt must be shifted back again. This repeated shifting of the belt in addition to reversing the actuating mechanism is another drawback of the belt-driven arrangement.

An object of the invention is to obviate the disadvantages that are inherent in the belt-driven arrangement. Another object is to provide a removable film magazine, the mere attachment of which to the film-handling apparatus establishes driving connection between one or more spindles rotatably supported by the magazine and the reversible actuating mechanism associated with the apparatus. A further object is to provide in film-handling apparatus employing removable film magazines an improved, efficient, and quiet-running combination of elements, whereby selective driving connection may be established between the actuating mechanism associated with the apparatus and either of a pair of spindles rotatably supported by the removable magazine or magazines, the selection being determined solely by the direction in which the actuating mechanism is operated, so that either spindle may serve as take-up spindle if desired.

To accomplish these objects, there is provided in the film-handling apparatus a driving gear which is rotated by the reversible actuating mechanism, and a shiftable gear which meshes with the driving gear. When the removable magazine or magazines are attached to the apparatus, the shiftable gear is maintained in driving connection with one of the two spindles at one end of its shift by the rotation of the driving gear in one direction and with the other of the two spindles at the other end of its shift by the rotation of the driving gear in the reverse direction, and it shifts automatically when the direction of rotation of the driving gear is reversed. The selective driving connection between the shiftable gear and either of the two spindles may be established by providing for each spindle a driven gear which is rotatably supported by the magazine and in driving connection with its associated spindle, and by adapting the shiftable gear to mesh at one end of its shift with one of the two driven gears or an intermediate gear and at the other end of its shift with the other of the two driven gears or with another intermediate gear, the two intermediate gears being rotatably supported by the apparatus and each meshing with one of the two driven gears.

It is understood that other driving connections than the belt have previously been used or suggested. But these have been relatively complicated and expensive mechanisms involving separate shaft couplings and separate ratchet devices, overrunning clutches, or the like, for each spindle to provide driving connection upon the attachment of the magazine and take-up in the normal or reverse directions, respectively. Accordingly, a further object of the invention is to provide a simple driving connection for film-handling apparatus employing removable film magazines, which is cheaper in manufacture, more dependable in operation, and generally more satisfactory than arrangements known heretofore.

Other objects and advantages include those which are hereinafter stated or apparent or which are incidental to the invention. The invention will be better understood when the following description is considered with the accompanying drawings of several embodiments thereof set forth by way of example, and its scope will be pointed out in the appended claims.

Referring first to Figs. 1 to 5, a driving gear 92 is fixed to a shaft 90 which is rotatably supported in any convenient manner by the casing 91 of a film-handling apparatus, and which is rotated by the reversible actuating mechanism associated with the apparatus (not shown). An arm 93 of suitable shape and configuration is pivotally mounted at its one end to shaft 90, that is, to the center of rotation 94 of gear 92. At its other end, arm 93 carries mounted for rotation a gear 95 which continuously meshes with gear 92. Thus, gear 95 is adapted to act as a planetary gear with respect to gear 92.

Figure 1:
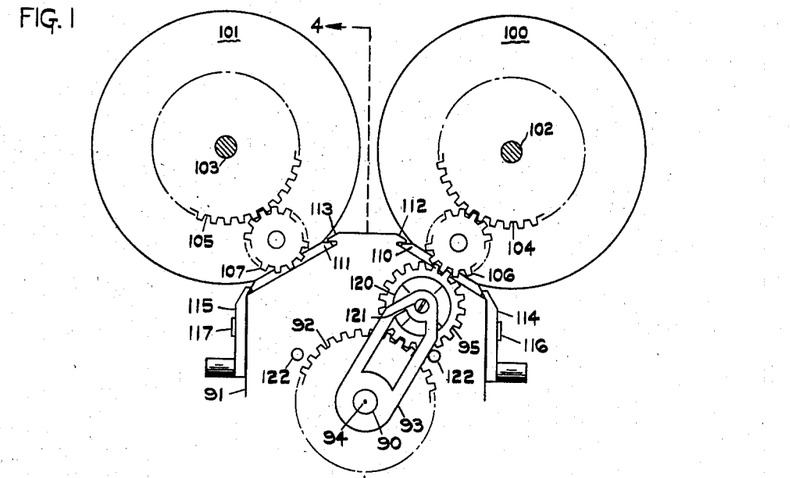
Fig. 1 shows the invention embodied in a film-handling apparatus employing two removable film magazines, the apparatus being shown in section and the magazines in side elevation.

Two removable film magazines 100 and 101 are provided, each capable of housing a single film roll and having centered in, and rotatably supported by, it a spindle 102, 103, respectively. Spindles 102 and 103 may be conveniently alike and provided, inside of the magazine, with the customary hub and key arrangement for carrying the cores on which the film is wound. Gears 104 and 105 are pinned to spindles 102 and 103, respectively, and mesh with gears 106 and 107, respectively, which are rotatably supported by magazines 100 and 101, respectively. Gear trains 104 and 106, and 105 and 107, may conveniently be placed on the outside of magazines 100 and 101, respectively, so as to extend from spindles 102 and 103 toward the bases 110 and 111 of the magazines, as shown in Fig. 1. Bases 110 and 111 may fit into overhanging lips 112 and 113, respectively, on casing 91, and clamps 114 and 115, pivoted at 116 and 117 to casing 91, may hold magazines 100 and 101 in position on casing 91, or any other suitable means for securing magazines 100 and 101 to casing 91 may be provided.

Figure 2:
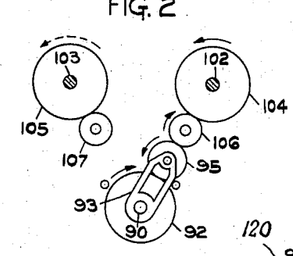
Figs. 2 and 3 are diagrammatic views of the moving parts shown in Fig. 1, illustrating two different conditions of operation.

The relative arrangement of the parts shown and described hereinabove is such that, when magazines 100 and 101 are attached to the film-handling apparatus, as shown in Fig. 1, planetary gear 95 is adapted to fit into mesh with either gear 106 or gear 107. When, therefore, after the attachment of the magazines to the apparatus, the actuating mechanism is started so as to rotate driving gear 92 through shaft 90 in a clockwise direction, planetary gear 95 automatically shifts to the right into the position shown in Fig. 1, in which it is in mesh with gear 106 (if it is not already in that position). Driving connection is thus established through gears 95, 106, and 104, between driving gear 92 and spindle 102, and spindle 102 is rotated in a counterclockwise direction, so that it takes up film loaded on spindle 103 and threaded in a suitable manner (not shown) through the film-handling apparatus. At the same time, planetary gear 95 is entirely clear of gear 107, so that spindle 103 is free to rotate and to unwind film. The parts are thus disposed and operating as shown in Fig. 2.

Figure 3:
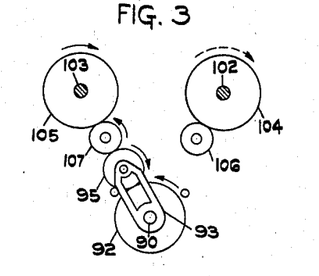

If now it is desired to wind film in the opposite direction, all that the operator need do, so far as the take-up is concerned, is to reverse the actuating mechanism, whereupon driving gear 92 is rotated in a counterclockwise direction. Upon such reversal of the direction of rotation of gear 92, gear 95, being a planetary gear, automatically shifts from its right-hand to its left-hand position into mesh with gear 107, and gear 106 is left clear. Through gears 95, 107, and 105, driving connection is now established between driving gear 92 and spindle 103 so as to rotate spindle 103 in a clockwise direction. The film is now taken up on spindle 103, and spindle 102 is free to unwind film; the condition of the parts being as shown in Fig. 3.

When either spindle 102 or spindle 103 is feeding, the associated gears 104 and 106 or 105 and 107 rotate and, by reason of their frictional loss, provide a slight drag on the feeding spindle. This drag beneficially counteracts any tendency of that spindle to spin and to unwind film too quickly, whereby the film might jam and be scratched or otherwise injured inside of the film-handling apparatus. Thus, special devices for the prevention of spinning of the feeding spindle may be dispensed with.

As stated previously, planetary gear 95 is rotatably carried by arm 93. Hence, when gear 95 is in a central position between gears 106 and 107 at the start of the driving operation, it might simply rotate and not shift to the desired position. Provision, therefore, must be made that gear 95 begins to turn only after it has fitted into mesh with either gear 106 or 107, for example, by placing a spring friction washer 120 on the screw 121 or other means by which planetary gear 95 is rotatably supported on arm 93. Stops 122, 122, limit the shift of arm 93 when gear 95 is appropriately in mesh with either gear 106 or gear 107, and so prevent binding.

In the particular example of Fig. 1 gears 92, 95, and 104 to 107, are shown as being different in size. However, gears 92, 95, and 104 to 107, may also be equal in size, or any other variation in size and number of the gears may be chosen, and will depend chiefly upon the dimensions and arrangement of the magazines and upon the speed at which drive is to be transmitted to spindles 102 and 103 from the actuating mechanism. Furthermore, gear 106 and spindle 102, and gear 107 and spindle 103, need not be in driving connection through gears 104 and 105, respectively, but may be connected through a belt arrangement, for example, such as is shown in Fig. 9 of my co-pending application Serial No. 231,030, of which this application is a division.

Since the film must ordinarily travel through the film-handling apparatus with constant speed, the rate of rotation of the take-up spindle must decrease as the film builds up on this spindle in order to maintain a constant peripheral film speed. In the commonly used 'belt-driven arrangement, this variation in speed is achieved by permitting the belt to slip, either by using a resiliently mounted tightening idler for a non-extensible belt, or by using a belt made, for example, of coiled spring wire so that it will stretch and slip when needed. Either of these expedients for getting the slippage required may be employed when the belt arrangement referred to in the preceding paragraph is used in conjunction with a driving connection according to the present invention. Another way of adapting spindles 102 and 103 to receive slipping drive, if desired, is to mount to each spindle any suitable clutch that will allow for slippage.

Figure 4:
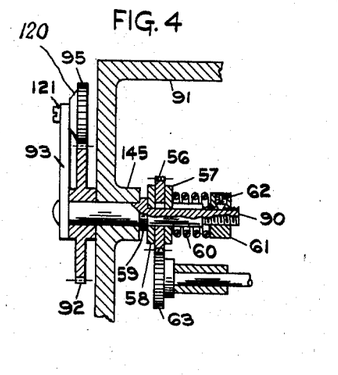
Fig. 4 is an enlarged section on the broken line 4—4 of Fig. 1 including in like section certain associated parts of the film-handling apparatus.

In a presently preferred embodiment of the invention, however, a single adjustable clutch is so arranged that slipping drive is provided for spindle 102, or spindle 103, whichever it is desired to use as a take-up spindle. As shown in Fig. 4, shaft 90 which fixedly carries driving gear 92 may be journalled in the boss 145 which protrudes from casing 91. A gear 56 is rotatably mounted on shaft 90 and has at each side washers 57 and 58, each keyed to shaft 90. Washer 58 is fixed against longitudinal displacement on shaft 90, for example, by setting it against a flange 59 thereon, whereas washer 57 is slidable along shaft 90. That face of washer 57 which is away from gear 56 is engaged by a spring 60, held in compression against the assembly of gear 56 and washers 57, 58, by a collar 61 adjustably secured to shaft 90 with a set-screw 62, or the like. Gear 56 is engaged by a driving gear 63, which may be suitably connected to receive drive from the actuating mechanism associated with the film-handling apparatus.

In this manner, a single clutch may provide slippage for either of the spindles of each of a plurality of pairs of removable film magazines which may be attached to the film-handling apparatus in succession, and thus manufacture of the magazines is simplified and cheapened. Moreover, the particular slipping clutch described in connection with Fig. 4 has proved dependable in practice, and has the advantage of being readily adjustable, either initially or even from time to time, if required, so as to increase or decrease the friction between its working elements.

The drive for gear 63, or for shaft 90 if the single slipping clutch described above is not employed, is advantageously derived from the principal motor or other actuating mechanism of the apparatus (not shown), so that the film take-up will be appropriately timed and synchronized with the operation of other film-handling and working parts.

Figure 5:
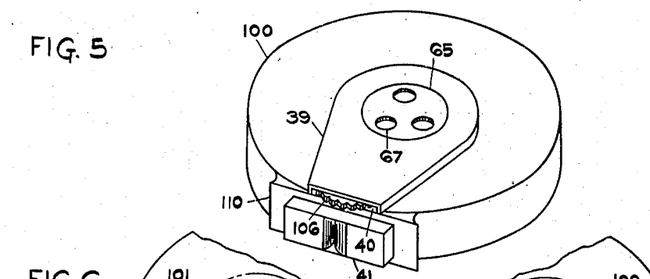
Fig. 5 is a perspective view of one of the removable film magazines shown in Fig. 1 with a cover plate, a rotating disk and a block added.

As it is at times desirable to rotate spindle 102 or spindle 103 by hand, for example, in order to take up slack which may have been left in threading the film through the apparatus, suitable wheels or disks may be pinned to spindles 102 and 103 on top of gears 104 and 105, respectively. For example, as shown in Fig. 5 for magazine 100, there may be pinned to spindle 102 a disk 65 provided with suitable apertures 67, 67 . . . to be engaged by the fingers. When spindle 102 or 103 is driven by the actuating mechanism, the disk associated therewith will turn around and thus indicate which spindle is being driven, the driving speed, and so forth.

To protect the gearing against dirt, dust, and the like, cover plates may be fitted flatwise against magazines 100 and 101. For example, as shown in Fig. 5, there may be fitted against magazine 100 a cover plate 39 provided with an opening 40 through which gear 106 protrudes slightly, and with another suitable opening in which disk 65 may be fitted in order to be accessible to the operator.

Finally, suitable blocks may be mounted in the centers of bases 110 and 111 of magazines 100 and 101. For example, as shown again in Fig. 5, a block 41 may be mounted in the center of base 110. Block 41 may have appropriate apertures through which the film may enter or leave the film-handling apparatus, and it may serve to locate the magazine on the apparatus when base 110 is fitted into overhanging lip 112 on casing 91.

It will thus be seen that, when the removable film magazines 100 and 101 are attached to the casing 91 of the film-handling apparatus, selective driving connection is established between the actuating mechanism associated with the apparatus, and either spindle 102, rotatably supported by magazine 100, or spindle 103, rotatably supported by magazine 101, the selection being determined solely by the direction in which the actuating mechanism is operated. This result is achieved by a simple, efficient, and reliable combination of elements, which consists essentially of the driving gear 92 and the planetary gear 95, rotatably supported by the apparatus, and the driven gears 106 and 107, rotatably supported by the magazines. These four gears are so arranged that planetary gear 95 is maintained in mesh with driven gear 106 at one end of its shift by the rotation of driving gear 92 in a clockwise direction and with driven gear 107 at the other end of its shift by the rotation of driving gear 92 in a counterclockwise direction, and that planetary gear 95 shifts automatically from one drive transmitting position to the other when the direction of rotation of driving gear 92 is reversed.

Figure 6:
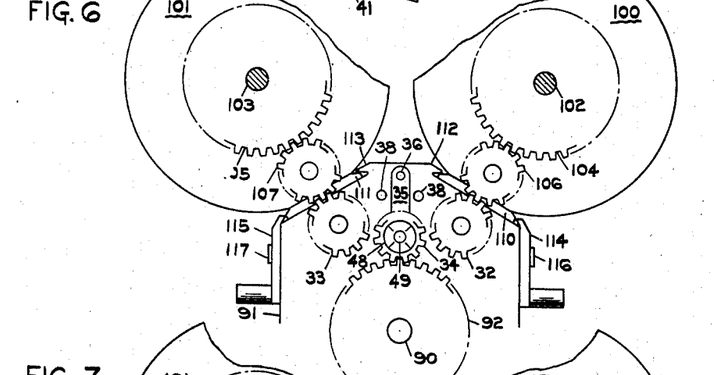
Figs. 6 and 7 show two other embodiments of the invention, a film-handling apparatus being shown in section and two removable film magazines in side elevation.
Figure 7:
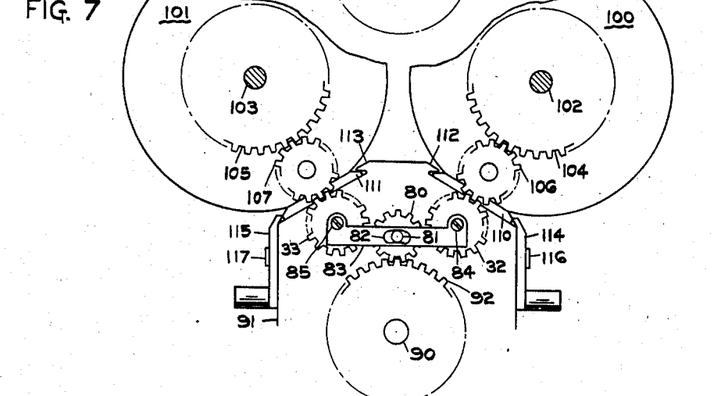

However, a planetary gear is not the only means by which the selective driving connection according to the invention may be established. Any other gear that shifts automatically when the direction of rotation of driving gear 92 is reversed, may be employed to advantage in the combination characterized in the preceding paragraph. Such a shiftable gear may be provided in various manners, two of which are shown by way of example in Figs. 6 and 7. Except for the modifications discussed hereinbelow, Figs. 6 and 7 show the same film-handling apparatus and removable film magazines which are shown in Figs. 1 and 5, and identical parts are hence designated by identical reference characters. In the modification of Fig. 6, there are provided two gears 32 and 33 which are rotatably supported by casing 91 of the film-handling apparatus in such a manner that they mesh with gears 106 and 107, respectively, when magazines 100 and 101 are secured to casing 91. Gears 32 and 33 are spaced somewhat apart, and placed between them is a gear 34, which is rotatably carried by an arm 35 and meshes with driving gear 92. Arm 35 is pivoted to casing 91 at a point 36 so as to swing within casing 91 in such a manner that gear 34 shifts in the plane of gears 32 and 33. By virtue of this arrangement, gear 34 is maintained in mesh with gear 32, and clear of engagement with gear 33, at one end of its shift when driving gear 92 is rotated in a clockwise direction, while it is maintained in mesh with gear 33, and clear of gear 32, at the other end of its shift when driving gear 92 is rotated in a counterclockwise direction, and it furthermore shifts automatically from one drive transmitting position to the other when the direction of rotation of driving gear 92 is reversed. Thus, with magazines 100 and 101 attached to casing 91, selective driving connection is again established between the actuating mechanism associated with the apparatus and either spindle 102 or spindle 103. Similar to the arrangement shown in Fig. 1, stops 38, 38, may be provided on both sides of arm 35 to limit its swing when gear 34 is appropriately in mesh with either gear 32 or gear 33 and so to prevent binding, and a spring friction washer 48 may be placed under the head of the screw 49 by which gear 34 is rotatably mounted on arm 35 to prevent gear 34 from spinning before it is in mesh with either gear 32 or gear 33.

In Fig. 7, there is shown in place of gear 34 and the pivoted arm 35 by which it is rotatably and shiftably carried, a gear 80 which is fixedly mounted to a shaft 81. Shaft 81 may alternatively be displaced laterally along, or rotate at the ends of, the slot 82, provided in a bracket or the like 83, and may be supported, on the rear side of gear 80, by a corresponding recess (not shown) in the rear wall of casing 91. If desired, slot 82 and the recess in casing 91 may be slightly curved, as shown for slot 82 in Fig. 7. Bracket 83 is mounted to casing 91 at suitable points, and the screws 84 and 85 or like mounting means may serve as shafts for gears 32 and 33. The arrangement is such that gear 80, meshing with driving gear 92, will shift sidewise into, and be maintained in, mesh with either gear 32 or gear 33, the direction of the shift and the maintenance of the mesh depending upon whether driving gear 92 is rotated in a clockwise or in a counterclockwise direction; the dimensions of slot 82 and of the corresponding recess in casing 91 being conveniently such as to allow shiftable gear 80 to mesh appropriately with either gear 32 or gear 33, but at the same time such as to limit the shift to prevent binding.

While planetary gear 95 has been shown in Fig. 1 and described hereinabove as meshing immediately with the driven gears 106 and 107, respectively, which are rotatably supported by magazines 100 and 101, the shiftable gears 34 and 80 have been shown in Figs. 6 and 7 and described hereinabove as meshing with the intermediate gears 32 and 33, respectively, which are rotatably supported by casing 91 and which, in their turn, mesh with driven gears 106 and 107, respectively. However, intermediate gears 32 and 33 may also be provided when planetary gear 95 is employed as the shiftable gear in the selective driving connection according to the present invention. This is indicated in a diagrammatic manner in Fig. 8 wherein planetary gear 95 meshes with either gear 32 or gear 33, which are both rotatably supported by the film-handling apparatus, and driven gears 106 and 107 mesh with gears 32 and 33, respectively, when the magazines are attached to the apparatus.

Figure 9:
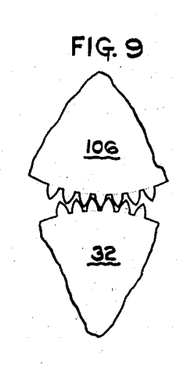
Fig. 9 shows a modified detail of Figs. 6, 7, and 8.

Since on attachment of the magazines the teeth of gears 106 and 107 initially may abut on rather than engage the teeth of gears 32 and 33, respectively, it is desirable to make provision for insuring that the respective pairs of gears will finally fit into mesh with each other. This may be achieved, for example, by giving to their teeth such a shape that they automatically slide into meshing position if they happen to abut on each other, for example, by making them pointed as shown in Fig. 9. No such provision is necessary where the shiftable gear is adapted immediately to mesh with either driven gear 106 or driven gear 107. It has been pointed out hereinabove that this arrangement is shown by way of example in Fig. 1 with planetary gear 95 as the shiftable gear. But it will easily be understood that, if desired, the shiftable gears 34 and 80, shown in Figs. 6 and 7, may also be adapted immediately to mesh with either driven gear 106 or driven gear 107, so that intermediate gears 32 and 33 may also be dispensed with when shiftable gears 34 and 80 are employed in place of planetary gear 95.

Figure 10:
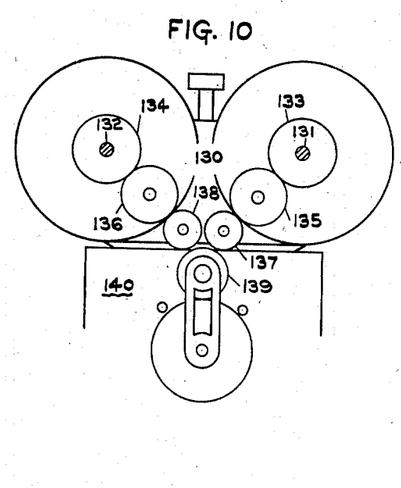
Figs. 10 and 11 show in a somewhat diagrammatic manner film-handling apparatus similar to those of Figs. 1 and 8 but employing a single removable film magazine.
Figure 11:
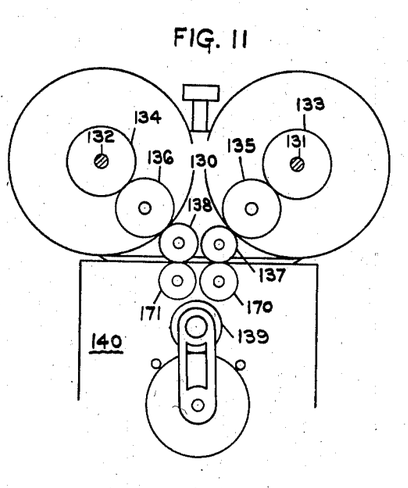

Spindles 102 and 103 have been shown in Figs. 1, 5, and 6 to 8, and described hereinabove as being rotatably supported each by a removable single-roll film magazine. However, the selective driving connection according to the present invention may also be employed when the removable means for rotatably supporting the spindles consist of a single two-roll film magazine. This is illustrated by way of example and in a somewhat diagrammatic manner in Fig. 10 for the driving connection of Fig. 1, and in Fig. 11 for the driving connection of Fig. 8. In Fig. 10, the single removable film magazine 130 rotatably supports the two spindles 131 and 132, each of which has associated with it a train of gears 133, 135, and 137, and 134, 136, and 138, respectively. The terminal gears 137 and 138 are somewhat apart, and they are so placed that planetary gear 139 may mesh with either gear 137 or gear 138 when the magazine 130 is attached to the film-handling apparatus 140. In Fig. 11, on the other hand, planetary gear 139 is adapted to mesh with either intermediate gear 170 or intermediate gear 171, both of which are rotatably supported by the apparatus 140, and gears 170 and 171 mesh with driven gears 137 and 138 when magazine 130 is attached to apparatus 140.

Magazine 130 may be similar in general appearance and constructional detail to the film magazine shown in Figs. 1 and 2 of my co-pending application Serial No. 231,030, and while in Figs. 10 and 11 there is shown a planetary gear as the shiftable gear of the selective driving connection, it will be easily understood from the foregoing explanation that shiftable gears such as gear 34 of Fig. 6 or gear 80 of Fig. 7 may also be used in embodiments of the invention employing a single removable film magazine.

Finally, film-handling apparatus such as are shown in Figs. 1, 6, and 7, may also be used in bi-pack work in conjunction with two removable film magazines, each of which may be of the general type shown in Figs. 1, 2, and 9, of my co-pending application Serial No. 231,030 provided, however, that the gears 34 or 80 of those magazines are not shiftably mounted but journaled to the central portions 12 or 72 thereof and in continuous mesh with the adjacent gears 32 and 33, or 86 and 87, thereon. Then, both spindles of each of the two magazines will either take up or feed, and the selection of the two take-up spindles will be determined solely by the direction in which the actuating mechanism associated with the film-handling apparatus is operated.

Figure 8:
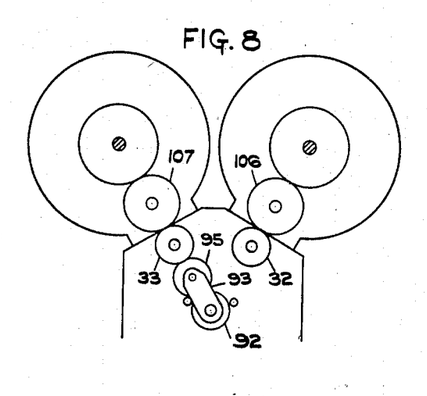
Fig. 8 is a diagram of a modification of the film-handling apparatus shown in Fig. 1.

The terms "gear" and "gears" as used throughout the description and in the appended claims include friction wheels as well as toothed wheels, the employment of friction wheels being indicated by way of example in Figs. 8, 10 and 11. It is understood that friction wheels come into rolling driving contact rather than that they mesh with each other, and description and claims are to be read correspondingly.

What is claimed is:

1. In combination, a film-handling apparatus, a reversible driving gear rotatably supported by said apparatus, a first spindle and a second spindle, means for rotatably supporting said first and second spindle, said supporting means being removably attached to said apparatus, and connecting means supported by said apparatus for establishing selective driving connection between said driving gear and either said first spindle or said second spindle, said connecting means including a shiftable gear meshing with said driving gear; said shiftable gear being maintained in driving connection with said first spindle at one end of its shift by the rotation of said driving gear in one direction and with said second spindle at the other end of its shift by the rotation of said driving gear in the reverse direction and shifting automatically when the direction of rotation of said driving gear is reversed.

2. In combination, a film-handling apparatus, a reversible driving gear rotatably supported by said apparatus, a first driven gear and a second driven gear, means for rotatably supporting said first and second driven gears, said supporting means being removably attached to said apparatus, and connecting means supported by said apparatus for establishing selective driving connection between said driving gear and either said first driven gear or said second driven gear, said connecting means including a shiftable gear meshing with said driving gear; said shiftable gear being maintained in driving connection with said first driven gear at one end of its shift by the rotation of said driving gear in one direction and with said second driven gear at the other end of its shift by the rotation of said driving gear in the reverse direction and shifting automatically when the direction of rotation of said driving gear is reversed.

3. In combination, a film-handling apparatus, a reversible driving gear rotatably supported by said apparatus, a first driven gear and a second driven gear, means for rotatably supporting said first and second driven gears, said supporting means being removably attached to said apparatus, and connecting means supported by said apparatus for establishing selective driving connection between said driving gear and either said first driven gear or said second driven gear; said connecting means including an arm swinging at one end around a pivot and a third driven gear rotatably supported at the other end of said arm and meshing with said driving gear, said third driven gear being maintained in driving connection with said first driven gear at one end of the swing of said arm by the rotation of said driving gear in one direction and with said second driven gear at the other end of the swing of said arm by the rotation of said driving gear in the reverse direction, and said arm swinging automatically when the direction of rotation of said driving gear is reversed.

4. In combination, a film-handling apparatus, a reversible driving gear rotatably supported by said apparatus, a first driven gear and a second driven gear, means for rotatably supporting said first and second driven gears, said supporting means being removably attached to said apparatus, and connecting means supported by said apparatus for establishing selective driving connection between said driving gear and either said first driven gear or said second driven gear; said connecting means including a shaft, means supporting said shaft alternatively for lateral displacement or rotary movement, and a third driven gear fixedly mounted on said shaft and meshing with said driving gear, said third driven gear being maintained in driving connection with said first driven gear at one end of the lateral displacement of said shaft by the rotation of said driving gear in one direction and with said second driven gear at the other end of the lateral displacement of said shaft by the rotation of said driving gear in the reverse direction, and said shaft being laterally displaced automatically when the direction of rotation of said driving gear is reversed.

5. In combination, a film-handling apparatus, a reversible driving gear rotatably supported by said apparatus, a first driven gear and a second driven gear, means for rotatably supporting said first and second driven gears, said supporting means being removably attached to said apparatus, and connecting means supported by said apparatus for establishing selective driving connection between said driving gear and either said first driven gear or said second driven gear; said connecting means including an arm pivoted at one end to the center of rotation of said driving gear and swinging around said pivot and a third driven gear rotatably supported at the other end of said arm and meshing with said driving gear, said third driven gear being maintained in driving connection with said first driven gear at one end of the swing of said arm by the rotation of said driving gear in one direction and with said second driven gear at the other end of the swing of said arm by the rotation of said driving gear in the reverse direction, and said arm swinging automatically when the direction of rotation of said driving gear is reversed.

6. In combination, a film-handling apparatus adapted for the attachment of removable means which rotatably support a first spindle and a second spindle, a reversible driving gear rotatably supported by said apparatus, and connecting means supported by said apparatus for establishing selective driving connection between said driving gear and either said first spindle or said second spindle when said supporting means are attached to said apparatus, said connecting means including a shiftable gear meshing with said driving gear; said shiftable gear being adapted to be maintained in driving connection with said first spindle at one end of its shift by the rotation of said driving gear in one direction and with said second spindle at the other end of its shift by the rotation of said driving gear in the reverse direction and shifting automatically when the direction of rotation of said driving gear is reversed.

7. In combination, a film-handling apparatus adapted for the attachment of removable means which rotatably support a first driven gear and a second driven gear, a reversible driving gear rotatably supported by said apparatus, and connecting means supported by said apparatus for establishing selective driving connection between said driving gear and either said first driven gear or said second driven gear when said supporting means are attached to said apparatus, said connecting means including a shiftable gear meshing with said driving gear; said shiftable gear being adapted to be maintained in driving connection with said first driven gear at one end of its shift by the rotation of said driving gear in one direction and with said second driven gear at the other end of its shift by the rotation of said driving gear in the reverse direction and shifting automatically when the direction of rotation of said driving gear is reversed.

8. In combination, a film-handling apparatus adapted for the attachment of removable means which rotatably support a first driven gear and a second driven gear, a reversible driving gear rotatably supported by said apparatus, and connecting means supported by said apparatus and adapted to establish selective driving connection between said driving gear and either said first driven gear or said second driven gear when said supporting means are attached to said apparatus; said connecting means including an arm swinging at one end around a pivot and a third driven gear rotatably supported at the other end of said arm and meshing with said driving gear, said third driven gear being adapted to be maintained in driving connection with said first driven gear at one end of the swing of said arm by the rotation of said driving gear in one direction and with said second driven gear at the other end of the swing of said arm by the rotation of said driving gear in the reverse direction, and said arm swinging automatically when the direction of rotation of said driving gear is reversed.

9. In combination, a film-handling apparatus adapted for the attachment of removable means which rotatably support a first driven gear and a second driven gear, a reversible driving gear rotatably supported by said apparatus, and connecting means supported by said apparatus and adapted to establish selective driving connection between said driving gear and either said first driven gear or said second driven gear when said supporting means are attached to said apparatus; said connecting means including a shaft, means supporting said shaft alternatively for lateral displacement or rotary movement, and a third driven gear fixedly mounted on said shaft and meshing with said driving gear, said third driven gear being adapted to be maintained in driving connection with said first driven gear at one end of the lateral displacement of said shaft by the rotation of said driving gear in one direction and with said second driven gear at the other end of the lateral displacement of said shaft by the rotation of said driving gear in the reverse direction, and said shaft being laterally displaced automatically when the direction of rotation of said driving gear is reversed.

10. In combination, a film-handling apparatus adapted for the attachment of removable means which rotatably support a first driven gear and a second driven gear, a reversible driving gear rotatably supported by said apparatus, and connecting means supported by said apparatus and adapted to establish selective driving connection between said driving gear and either said first driven gear or said second driven gear when said supporting means are attached to said apparatus; said connecting means including an arm pivoted at one end to the center of rotation of said driving gear and swinging around said pivot and a third driven gear rotatably supported at the other end of said arm and meshing with said driving gear, said third driven gear being adapted to be maintained in driving connection with said first driven gear at one end of the swing of said arm by the rotation of said driving gear in one direction and with said second driven gear at the other end of the swing of said arm by the rotation of said driving gear in the reverse direction, and said arm swinging automatically when the direction of rotation of said driving gear is reversed.

11. In combination, a film-handling apparatus, two film magazines removably attached to said apparatus, a reversible driving gear rotatably supported by said apparatus, a first driven gear rotatably supported by one of said magazines, a second driven gear rotatably supported by the other of said magazines, and a shiftable gear rotatably supported by said apparatus and meshing with said driving gear; said shiftable gear being maintained in mesh with said first driven gear at one end of its shift by the rotation of said driving gear in one direction and with said second driven gear at the other end of its shift by the rotation of said driving gear in the reverse direction and shifting automatically when the direction of rotation of said driving gear is reversed.

12. In combination, a film-handling apparatus; two film magazines removably attached to said apparatus; a reversible actuating mechanism associated with said apparatus; a driving gear rotatably supported by said apparatus and rotated by said actuating mechanism in one direction and, upon reversal of said actuating mechanism, in the reverse direction; a first spindle and a first driven gear in driving connection with said first spindle, said first spindle and said first driven gear rotatably supported by one of said magazines; a second spindle and a second driven gear in driving connection with said second spindle, said second spindle and said second driven gear rotatably supported by the other of said magazines; a shiftable gear rotatably supported by said apparatus and meshing with said driving gear, said shiftable gear being maintained in mesh with said first driven gear at one end of its shift by the rotation of said driving gear in one direction and with said second driven gear at the other end of its shift by the rotation of said driving gear in the reverse direction and shifting automatically when said actuating mechanism is reversed; and means for making the drive transmitted from said actuating mechanism through said gears selectively to either said first spindle or said second spindle a slipping drive.

13. In combination, a film-handling apparatus; two film magazines removably attached to said apparatus; a reversible actuating mechanism associated with said apparatus; a driving gear rotatably supported by said apparatus and rotated by said actuating mechanism in one direction and, upon reversal of said actuating mechanism, in the reverse direction; a first driven gear rotatably supported by one of said magazines; a second driven gear rotatably supported by the other of said magazines; a shiftable gear rotatably supported by said apparatus and meshing with said driving gear, said shiftable gear being maintained in mesh with said first driven gear at one end of its shift by the rotation of said driving gear in one direction and with said second driven gear at the other end of its shift by the rotation of said driving gear in the reverse direction and shifting automatically when said actuating mechanism is reversed; and means for making the drive transmitted from said actuating mechanism to said driving gear a slipping drive.

14. In combination, a film-handling apparatus, a film magazine removably attached to said apparatus, a reversible driving gear rotatably supported by said apparatus, a first driven gear and a second driven gear rotatably supported by said magazine, and a shiftable gear rotatably supported by said apparatus and meshing with said driving gear; said shiftable gear being maintained in mesh with said first driven gear at one end of its shift by the rotation of said driving gear in one direction and with said second driven gear at the other end of its shift by the rotation of said driving gear in the reverse direction and shifting automatically when the direction of rotation of said driving gear is reversed.

15. In combination, a film-handling apparatus; a film magazine removably attached to said apparatus; a reversible actuating mechanism associated with said apparatus; a driving gear rotatably supported by said apparatus and rotated by said actuating mechanism in one direction and, upon reversal of said actuating mechanism, in the reverse direction; a first spindle, a first driven gear in driving connection with said first spindle, a second spindle, a second driven gear in driving connection with said second spindle, said spindles and said driven gears rotatably supported by said magazine; a shiftable gear rotatably supported by said apparatus and meshing with said driving gear, said shiftable gear being maintained in mesh with said first driven gear at one end of its shift by the rotation of said driving gear in one direction and with said second driven gear at the other end of its shift by the rotation of said driving gear in the reverse direction and shifting automatically when said actuating mechanism is reversed; and means for making the drive transmitted from said actuating mechanism through said gears selectively to either said first spindle or said second spindle a slipping drive.

16. In combination, a film-handling apparatus, a film magazine removably attached to said apparatus; a reversible actuating mechanism associated with said apparatus; a driving gear rotatably supported by said apparatus and rotated by said actuating mechanism in one direction and, upon reversal of said actuating mechanism, in the reverse direction; a first driven gear and a second driven gear rotatably supported by said magazine; a shiftable gear rotatably supported by said apparatus and meshing with said driving gear, said shiftable gear being maintained in mesh with said first driven gear at one end of its shift by the rotation of said driving gear in one direction and with said second driven gear at the other end of its shift by the rotation of said driving gear in the reverse direction and shifting automatically when said actuating mechanism is reversed; and means for making the drive transmitted from said actuating mechanism to said driving gear a slipping drive.

17. In combination, a film-handling apparatus adapted for the attachment of two removable film magazines one of which rotatably supports a first driven gear and the other a second driven gear, a reversible driving gear, and a shiftable gear meshing with said driving gear; said driving and shiftable gears being rotatably supported by said apparatus, and said shiftable gear being adapted to be maintained in mesh with said first driven gear at one end of its shift by the rotation of said driving gear in one direction and with said second driven gear at the other end of its shift by the rotation of said driving gear in the reverse direction when said magazines are attached to said apparatus, and shifting automatically when the direction of rotation of said driving gear is reversed.

18. In combination a film-handling apparatus adapted for the attachment of two removable film magazines one of which rotatably supports a first driven gear and the other a second driven gear, a reversible actuating mechanism associated with said apparatus, a driving gear rotatably supported by said apparatus and rotated by said actuating mechanism in one direction and, upon reversal of said actuating mechanism in the reverse direction, a shiftable gear rotatably supported by said apparatus and meshing with said driving gear, and means for making the drive transmitted from said actuating mechanism to said driving gear a slipping drive; said shiftable gear being adapted to be maintained in mesh with said first driven gear at one end of its shift by the rotation of said driving gear in one direction and with said second driven gear at the other end of the shift by the rotation of said driving gear in the reverse direction when said magazines are attached to said apparatus, and shifting automatically when said actuating mechanism is reversed.

19. In combination, a film-handling apparatus adapted for the attachment of a removable film magazine which rotatably supports a first driven gear and a second driven gear, a reversible driving gear, and a shiftable gear meshing with said driving gear; said driving and shiftable gears being rotatably supported by said apparatus, and said shiftable gear being adapted to be maintained in mesh with said first driven gear at one end of its shift by the rotation of said driving gear in one direction and with said second driven gear at the other end of its shift by the rotation of said driving gear in the reverse direction when said magazine is attached to said apparatus, and shifting automatically when the direction of rotation of said driving gear is reversed.

20. In combination, a film-handling apparatus adapted for the attachment of a removable film magazine which rotatably supports a first driven gear and a second driven gear, a reversible actuating mechanism associated with said apparatus, a driving gear rotatably supported by said apparatus and rotated by said actuating mechanism in one direction and, upon reversal of said actuating mechanism in the reverse direction, a shiftable gear rotatably supported by said apparatus and meshing with said driving gear, and means for making the drive transmitted from said actuating mechanism to said driving gear a slipping drive; said shiftable gear being adapted to be maintained in mesh with said first driven gear at one end of its shift by the rotation of said driving gear in one direction and with said second driven gear at the other end of its shift by the rotation of said driving gear in the reverse direction when said magazine is attached to said apparatus, and shifting automatically when said actuating mechanism is reversed.

21. In combination, a film-handling apparatus, two film magazines removably attached to said apparatus, a reversible driving gear rotatably supported by said apparatus, a first driven gear rotatably supported by one of said magazines, a second driven gear rotatably supported by the other of said magazines, a first gear rotatably supported by said apparatus and meshing with said first driven gear, a second gear rotatably supported by said apparatus and meshing with said second driven gear, and a shiftable gear rotatably supported by said apparatus and meshing with said driving gear; said shiftable gear being maintained in mesh with said first gear at one end of its shift by the rotation of said driving gear in one direction and with said second gear at the other end of its shift by the rotation of said driving gear in the reverse direction and shifting automatically when the direction of rotation of said driving gear is reversed.

22. The combination of claim 21, in which said first and second driven gears and said first and second gears have pointed teeth.

23. In combination, a film-handling apparatus; two film magazines removably attached to said apparatus; a reversible actuating mechanism associated with said apparatus; a driving gear rotatably supported by said apparatus and rotated by said actuating mechanism in one direction and, upon reversal of said actuating mechanism in the reverse direction; a first spindle and a first driven gear in driving connection with said first spindle, said first spindle and said first driven gear rotatably supported by one of said magazines; a second spindle and a second driven gear in driving connection with said second spindle, said second spindle and said second driven gear rotatably supported by the other of said magazines; a first gear rotatably supported by said apparatus and meshing with said first driven gear; a second gear rotatably supported by said apparatus and meshing with said second driven gear; a shiftable gear rotatably supported by said apparatus and meshing with said driving gear; said shiftable gear being maintained in mesh with said first gear at one end of its shift by the rotation of said driving gear in one direction and with said second gear at the other end of its shift by the rotation of said driving gear in the reverse direction and shifting automatically when said actuating mechanism is reversed; and means for making the drive transmitted from said actuating mechanism through said gears selectively to either said first spindle or said second spindle a slipping drive.

24. The combination of claim 23, in which said first and second driven gears and said first and second gears have pointed teeth.

25. In combination, a film-handling apparatus; two film magazines removably attached to said apparatus; a reversible actuating mechanism associated with said apparatus; a driving gear rotatably supported by said apparatus and rotated by said actuating mechanism in one direction and, upon reversal of said actuating mechanism in the reverse direction; a first driven gear rotatably supported by one of said magazines; a second driven gear rotatably supported by the other of said magazines; a first gear rotatably supported by said apparatus and meshing with said first driven gear; a second gear rotatably supported by said apparatus and meshing with said second driven gear; a shiftable gear rotatably supported by said apparatus and meshing with said driving gear; said shiftable gear being maintained in mesh with said first gear at one end of its shift by the rotation of said driving gear in one direction and with said second gear at the other end of its shift by the rotation of said driving gear in the reverse direction and shifting automatically when said actuating mechanism is reversed; and means for making the drive transmitted from said actuating mechanism to said driving gear a slipping drive.

26. The combination of claim 25, in which said first and second driven gears and said first and second gears have pointed teeth.

27. In combination, a film-handling apparatus, a film magazine removably attached to said apparatus, a reversible driving gear rotatably supported by said apparatus, a first driven gear and a second driven gear rotatably supported by said magazine, a first gear rotatably supported by said apparatus and meshing with said first driven gear, a second gear rotatably supported by said apparatus and meshing with said second driven gear, and a shiftable gear rotatably supported by said apparatus and meshing with said driving gear; said shiftable gear being maintained in mesh with said first gear at one end of its shift by the rotation of said driving gear in one direction and with said second gear at the other end of its shift by the rotation of said driving gear in the reverse direction and shifting automatically when the direction of rotation of said driving gear is reversed.

28. The combination of claim 27, in which said first and second driven gears and said first and second gears have pointed teeth.

29. In combination, a film-handling apparatus; a film magazine removably attached to said apparatus; a reversible actuating mechanism associated with said aparatus; a driving gear rotatably supported by said apparatus and rotated by said actuating mechanism in one direction and, upon reversal of said actuating mechanism in the reverse direction; a first spindle, a first driven gear in driving connection with said first spindle, a second spindle, a second driven gear in driving connection with said second spindle, said spindles and said driven gears rotatably supported by said magazine; a first gear rotatably supported by said apparatus and meshing with said first driven gear; a second gear rotatably supported by said apparatus and meshing with said second driven gear; a shiftable gear rotatably supported by said apparatus and meshing with said driving gear; said shiftable gear being maintained in mesh with said first gear at one end of its shift by the rotation of said driving gear in one direction and with said second gear at the other end of its shift by the rotation of said driving gear in the reverse direction and shifting automatically when said actuating mechanism is reversed; and means for making the drive transmitted from said actuating mechanism through said gears selectively to either said first spindle or said second spindle a slipping drive.

30. The combination of claim 29, in which said first and second driven gears and said first and second gears have pointed teeth.

31. In combination, a film-handling apparatus, a film magazine removably attached to said apparatus; a reversible actuating mechanism associated with said apparatus; a driving gear rotatably supported by said apparatus and rotated by said actuating mechanism in one direction and, upon reversal of said actuating mechanism in the reverse direction; a first driven gear and a second driven gear rotatably supported by said magazine; a first gear rotatably supported by said apparatus and meshing with said first driven gear; a second gear rotatably supported by said apparatus and meshing with said second driven gear; a shiftable gear rotatably supported by said apparatus and meshing with said driving gear; said shiftable gear being maintained in mesh with said first gear at one end of its shift by the rotation of said driving gear in one direction and with said second gear at the other end of its shift by the rotation of said driving gear in the reverse direction and shifting automatically when said actuating mechanism is reversed; and means for making the drive transmitted from said actuating mechanism to said driving gear a slipping drive.

32. The combination of claim 31, in which said first and second driven gears and said first and second gears have pointed teeth.

33. In combination, a film-handling apparatus adapted for the attachment of two removable film magazines one of which rotatably supports a first driven gear and the other a second driven gear, a reversible driving gear, a first gear, a second gear, and a shiftable gear meshing with said driving gear; said driving, first, second, and shiftable gears being rotatably supported by said apparatus, said shiftable gear being maintained in mesh with said first gear at one end of its shift by the rotation of said driving gear in one direction and with said second gear at the other end of its shift by the rotation of said driving gear in the reverse direction and shifting automatically when the direction of rotation of said driving gear is reversed, and said first gear being adapted to mesh with said first driven gear and said second gear being adapted to mesh with said second driven gear when said magazines are attached to said apparatus.

34. In combination, a film-handling apparatus adapted for the attachment of two removable film magazines one of which rotatably supports a first driven gear and the other a second driven gear, a reversible actuating mechanism associated with said apparatus, a driving gear rotatably supported by said apparatus and rotated by said actuating mechanism in one direction and, upon reversal of said actuating mechanism in the reverse direction, a first gear and a second gear rotatably supported by said apparatus, a shiftable gear rotatably supported by said apparatus and meshing with said driving gear, and means for making the drive transmitted from said actuating mechanism to said driving gear a slipping drive; said shiftable gear being maintained in mesh with said first gear at one end of the shift by the rotation of said driving gear in one direction and with said second gear at the other end of its shift by the rotation of said driving gear in the reverse direction and shifting automatically when said actuating mechanism is reversed, and said first gear being adapted to mesh with said first driven gear and said second gear being adapted to mesh with said second driven gear when said magazines are attached to said apparatus.

35. In combination, a film-handling apparatus adapted for the attachment of a removable film magazine which rotatably supports a first driven gear and a second driven gear, a reversible driving gear, a first gear, a second gear, and a shiftable gear meshing with said driving gear; said driving, first, second, and shiftable gears being rotatably supported by said apparatus, said shiftable gear being maintained in mesh with said first gear at one end of its shift by the rotation of said driving gear in one direction and with said second gear at the other end of its shift by the rotation of said driving gear in the reverse direction and shifting automatically when the direction of rotation of said driving gear is reversed, and said first gear being adapted to mesh with said first driven gear and said second gear being adapted to mesh with said second driven gear when said magazine is attached to said apparatus.

36. In combination, a film-handling apparatus adapted for the attachment of a removable film magazine which rotatably supports a first driven gear and a second driven gear, a reversible actuating mechanism associated with said apparatus, a driving gear rotatably supported by said apparatus and rotated by said actuating mechanism in one direction and, upon reversal of said actuating mechanism in the reverse direction, a first gear and a second gear rotatably supported by said apparatus, a shiftable gear rotatably supported by said apparatus and meshing with said driving gear, and means for making the drive transmitted from said actuating mechanism to said driving gear a slipping drive; said shiftable gear being maintained in mesh with said first gear at one end of its shift by the rotation of said driving gear in one direction and with said second gear at the other end of its shift by the rotation of said driving gear in the reverse direction and shifting automatically when said actuating mechanism is reversed, and said first gear being adapted to mesh with said first driven gear and said second gear being adapted to mesh with said second driven gear when said magazine is attached to said apparatus.

ERIC M. BERNDT.